United States Patent
Ohara (10) Patent No.: US 9,185,258 B2
(45) Date of Patent: Nov. 10, 2015

(54) IMAGE READER (71) Applicant: SEIKO EPSON CORPORATION, Tokyo (JP)

(72) Inventor: Toshimitsu Ohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/487,896

(22) Filed: Sep. 16, 2014

(65) Prior Publication Data

US 2015/0103385 A1   Apr. 16, 2015

(30) Foreign Application Priority Data

Oct. 15, 2013  (JP) .................................. 2013-214418

(51) Int. Cl.
*H04N 1/04* (2006.01)
*H04N 1/10* (2006.01)

(52) U.S. Cl.
CPC .................................. *H04N 1/1026* (2013.01)

(58) Field of Classification Search
CPC .............. H04N 2201/0422; H04N 2201/0442; H04N 1/0464; H04N 2201/02402; H04N 2201/0432; H04N 2201/0448; H04N 2201/04755; B65H 2513/40; B65H 2701/1311; B65H 2301/33312; B65H 3/0684; B65H 5/021
USPC ......... 358/474, 486, 488, 497, 506, 461, 498; 271/10.12, 118, 145, 164, 8.1, 9.01, 271/9.06, 9.11, 9.13; 382/140, 162, 312
See application file for complete search history.

(56) References Cited

U.S. PATENT DOCUMENTS

| | | | | |
|---|---|---|---|---|
| 5,903,401 A * | 5/1999 | Tanaka et al. | ................. | 359/806 |
| 6,058,249 A * | 5/2000 | Matsuda et al. | ............. | 358/1.14 |
| 6,209,985 B1 * | 4/2001 | Minamizawa | .................. | 347/40 |
| 6,285,852 B1 * | 9/2001 | Etoh et al. | ..................... | 399/367 |
| 7,652,801 B2 * | 1/2010 | Haas et al. | ..................... | 358/474 |
| 7,733,538 B2 * | 6/2010 | Kanesaka et al. | ............. | 358/474 |
| 8,115,975 B2 * | 2/2012 | Shinkawa | ..................... | 358/474 |
| 8,300,279 B2 * | 10/2012 | Mukai et al. | .................. | 358/474 |
| 8,340,567 B2 * | 12/2012 | Katayama | ..................... | 399/405 |
| 8,462,398 B2 * | 6/2013 | Otsuki | ......................... | 358/474 |
| 8,547,604 B2 * | 10/2013 | Kozaki et al. | ................. | 358/474 |
| 2006/0028696 A1 * | 2/2006 | Michiie et al. | ................ | 358/474 |

FOREIGN PATENT DOCUMENTS

JP    2004-133151    4/2004

* cited by examiner

*Primary Examiner* — Negussie Worku
(74) *Attorney, Agent, or Firm* — Workman Nydegger (57) ABSTRACT

An image reader includes a reading carriage, on which a reading unit is mounted and which performs scanning along a document-sheet platen in a scanning direction, and an annular belt that draws the reading carriage. The belt includes a first side extending in the scanning direction to which the reading carriage is fixed, and a second side that is disposed to be spaced from the first side. The detection unit that detects a document sheet mounted on the document-sheet platen is disposed in a region between the first side and the second side of the belt in a direction intersecting with the scanning direction.

8 Claims, 5 Drawing Sheets

| 71 \ G | A5S | A4L | B5S | A4S | B4S | A3S |
|---|---|---|---|---|---|---|
| 71Y1 | 1 | 1 | 1 | 1 | 1 | 1 |
| 71Y2 | 0 | 1 | 1 | 1 | 1 | 1 |
| 71Y3 | 0 | 1 | 0 | 1 | 1 | 1 |
| 71Y4 | 0 | 1 | 0 | 0 | 1 | 1 |
| 71Y5 | 0 | 1 | 0 | 0 | 0 | 1 |
| 71X1 | 0 | 1 | 0 | 1 | 1 | 1 |
| 71X2 | 0 | 0 | 0 | 1 | 1 | 1 |

# IMAGE READER

BACKGROUND

1. Technical Field

The present invention relates to an image reader, such as a flatbed-type scanner.

2. Related Art

In the related art, an example of the image reader is a flatbed-type scanner which includes a reading carriage on which a sensor for reading a document sheet is mounted and which performs scanning in a scanning direction, an annular belt that draws the reading carriage, and three pulleys over which the belt is looped.

In such an image reader, two out of three pulleys are disposed on opposite ends in a scanning region of the reading carriage, and the remaining one pulley is disposed at a position overlapped with the scanning region of the reading carriage, such that the belt is stretched in a triangle (for example, JP-A-2004-133151).

Incidentally, in some cases, the image reader includes a detection unit, such as a reflective optical sensor, disposed on the side opposite to a mounting surface of a document-sheet platen where the document sheet is mounted, in order to detect the presence/absence of a document sheet mounted on the document-sheet platen. Since the detection unit is positioned to be overlapped with the scanning region of the reading carriage, there is concern that the detection unit interferes with the belt stretched in a triangle.

SUMMARY

An advantage of some aspects of the invention is to provide an image reader in which it is possible to suppress interference between a belt that draws a reading carriage and a detection unit that detects a document sheet.

Hereinafter, means of the invention and operation effects thereof will be described.

According to an aspect of the invention, an image reader includes a document-sheet platen that has a mounting surface of a document sheet on a first surface, a detection unit that detects a document sheet mounted on the mounting surface from a second surface side opposite to the first surface of the document-sheet platen, a reading unit that reads a document sheet mounted on the mounting surface from the second surface side of the document-sheet platen, a reading carriage on which the reading unit is mounted and which performs scanning along the document-sheet platen in the scanning direction, and an annular belt that draws the reading carriage. The belt has a first side extending in the scanning direction to which the reading carriage is fixed, and a second side that is disposed to be spaced from the first side. The detection unit is disposed in a region between the first side and the second side of the belt.

In this configuration, since the detection unit is disposed in the region between the first side and the second side of the belt, it is possible to suppress interference between the belt that draws the reading carriage and the detection unit that detects the document sheet. In addition, since the reading carriage is fixed to the first side of the belt which extends in the scanning direction, it is possible to suppress inclination of the reading carriage that is drawn by the belt, during scanning.

The image reader may further include a first pulley and a second pulley that are aligned in the scanning direction, and a third pulley that is disposed at a position different from the first pulley and the second pulley in a direction intersecting with the scanning direction. The belt may be looped over the first pulley, the second pulley, and the third pulley, and the first side may be formed between the first pulley and the second pulley.

In this configuration, since the belt is looped over the three pulleys, it is possible to obtain a wider region between the first side and the second side, than in a case of being looped over two pulleys. Accordingly, it is possible to flexibly dispose the detection unit in the region between the first side and the second side.

The image reader may further include a drive source for driving the reading carriage to perform scanning. The third pulley may be a drive pulley that rotates with a drive force from the drive source, and the drive source may be disposed at a position closer to the third pulley than to either the first pulley or the second pulley.

In this configuration, the drive source is disposed at a position closer to the third pulley than to the first pulley and to the second pulley, and thus it is possible to shorten a route to transmit the drive force from the drive source to the drive pulley.

In the image reader, an origin point may be set on a first end of the mounting surface in a direction intersecting with the scanning direction, the third pulley may be disposed at a position closer to the origin point than the first pulley and the second pulley in a direction intersecting with the scanning direction, and closer to the second pulley than to the first pulley in the scanning direction. The second side may be formed between the first pulley and the third pulley.

In this configuration, the third pulley is disposed closer to the origin point than the first pulley and the second pulley in a direction intersecting with the scanning direction, and thus, it is possible for a region formed between the first side and the second side of the belt to become wider toward the origin point side in the scanning direction. Accordingly, it is possible to dispose the detection unit, which is disposed in the region between the first side and the second side, at a position closer to the origin point.

In the image reader, an origin point may be set on a first end of the mounting surface in a direction intersecting with the scanning direction. The image reader may further include a second detection unit that detects a document sheet with a greater size than the first size, when the detection unit that detects a document sheet with a first size is set to a first detection unit. The second detection unit may be disposed at a position further separated from the origin point than the belt in a direction intersecting with the scanning direction.

In this configuration, in addition to the first detection unit disposed between the first side and the second side of the belt, the second detection unit is arranged at a position further separated from the origin point than the belt in a direction intersecting with the scanning direction, and thus, it is possible to detect document sheets with multiple sizes.

The image reader may further include a guide rail that guides the scanning of the reading carriage. When a direction intersecting with the scanning direction indicates the longitudinal direction of the reading carriage, the reading carriage may have an engagement portion with respect to the guide rail at a position separated from the opposite ends thereof in the longitudinal direction, and may be fixed to the belt at a position closer to the engagement portion than to the opposite ends.

In this configuration, since the reading carriage has the engagement portion with respect to the guide rail at a position separated from the opposite ends thereof in the longitudinal direction, the guide rail is disposed in the vicinity of the center of gravity on the reading carriage, and thus it is possible to suppress an inclination of the reading carriage in the perpendicular direction. In addition, since the reading carriage is fixed to the belt at a position close to the engagement portion that engages with the guide rail, it is possible to suppress the inclination of the reading carriage in the scanning direction, which is drawn by the belt.

In the image reader, the detection unit and the belt may be arranged to overlap one another in the perpendicular direction and be aligned in the horizontal direction.

In addition, in the image reader, the detection unit, the belt, and the guide rail may be arranged to overlap one another in the perpendicular direction and be aligned in the horizontal direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of an image reader will be described with reference to the drawings.

The image reader is a flatbed-type scanner that is stacked on top of a printer, which is an example of a recording apparatus, in a perpendicular direction, and that configures a multifunction printer.

Figure 1:
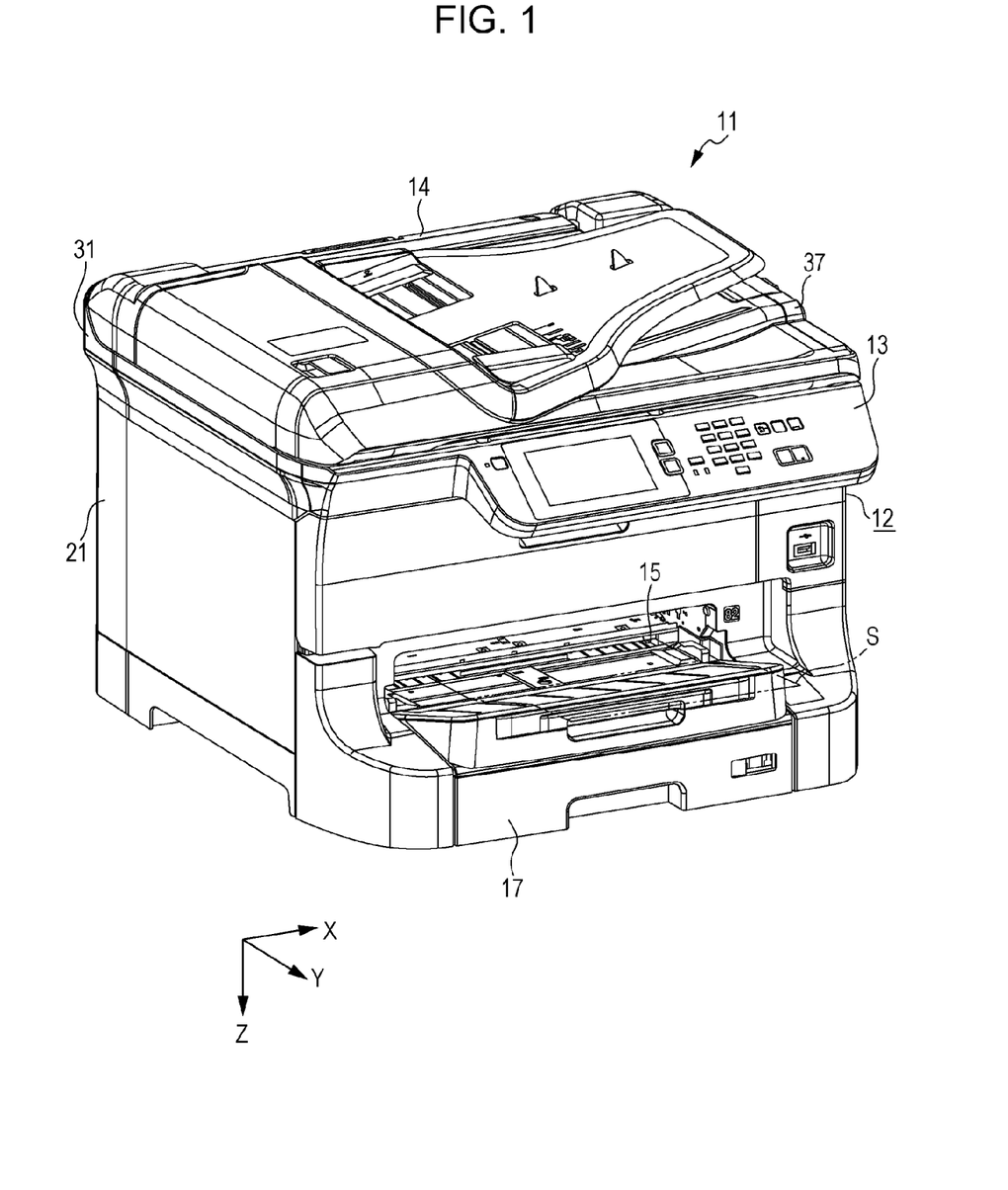
FIG. 1 is a perspective view of a multifunction printer including an image reader according to an embodiment.

As shown in FIG. 1, a multifunction printer 11 according to the embodiment includes a recording apparatus 21 that performs printing (recording) on a recording medium S, such as a sheet, and an image reader 31 that is stacked on top of the recording apparatus 21 in the perpendicular direction.

In the multifunction printer 11, an operation panel 13 for operating the multifunction printer 11 projects forward from the front side of an apparatus main body 12 in which the recording apparatus 21 and the image reader 31 are integrated. A display unit for displaying a menu screen or the like, operation buttons, or the like, can be arranged on the operation panel 13.

A cover member 14 that covers an opening (not shown) for inserting the recording medium S is provided on the rear surface side of the apparatus main body 12. A discharge portion 15 for discharging the recording medium S is provided at a position below the operation panel 13 in the perpendicular direction on the front surface side of the apparatus main body 12. In addition, an accommodation cassette 17 that accommodates multiple recording mediums S in a state of being stacked is detachably mounted on the lower part of the apparatus main body 12.

Figure 2:
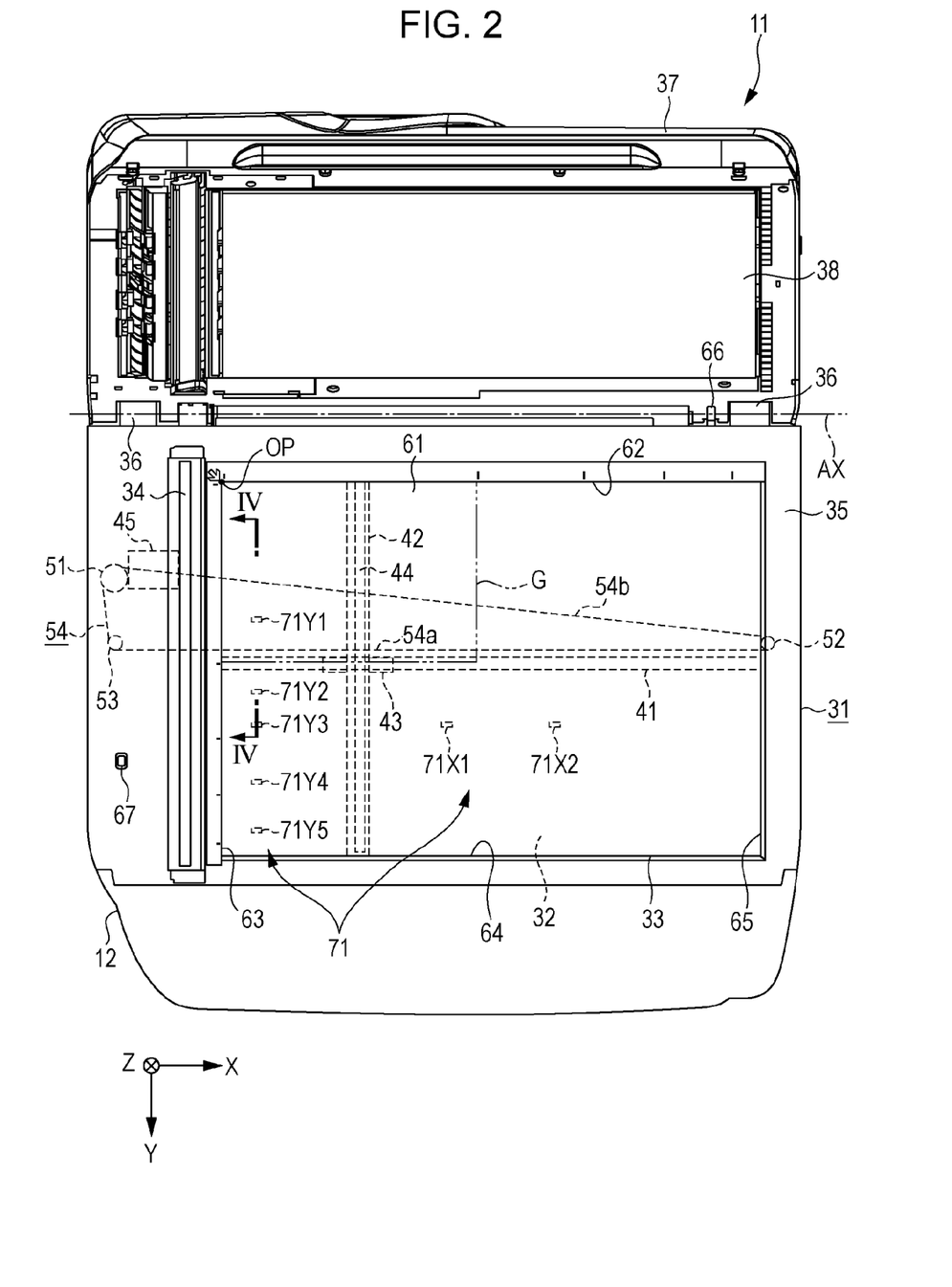
FIG. 2 is a top view of the multifunction printer in which an opening/closing body is disposed at an opening position.

As shown in FIG. 2, the image reader 31 includes a bottomed box-like reading-unit case 32, a document-sheet platen 33 and a reading platen 34 that are fit in an upper opening of the reading-unit case 32, a frame member 35 for fixing the document-sheet platen 33 and the reading platen 34, and an opening/closing body 37 that is attached rotatably with hinges 36 provided on the rear surface side.

The document-sheet platen 33 and the reading platen 34 can be made of transparent glass with a square plate shape. The reading platen 34 is shorter than the document-sheet platen 33 in the longitudinal direction of the apparatus main body 12 (right/left direction in FIG. 2). The reading platen 34 is disposed on one side of the document-sheet platen 33 (left side in FIG. 2) in the longitudinal direction of the apparatus main body 12.

The opening/closing body 37 is, for example, an automatic document sheet feeder that inverts stacked multiple document sheets G one by one and feeds the stacked multiple document sheets G one by one onto the reading platen 34. A white document-sheet cover 38 for pressing the document sheets G mounted on the document-sheet platen 33 is attached to the opening/closing body 37. The opening/closing body 37 may be a plate-like lid member to which the white document-sheet cover 38 is attached. In a case where the opening/closing body 37 is a lid member without a function as the automatic document sheet feeder, the reading platen 34 may not be provided.

The document-sheet platen 33 has a rectangular mounting surface 61 on which the document sheet G is mounted on a first surface that is a top surface according to the embodiment. On the mounting surface 61, an origin point OP is set on one end (left end in FIG. 2) of the apparatus main body 12 in the longitudinal direction, that is, on a first end on the rearward side close to a rotational axis AX of the opening/closing body 37 in the front/rear direction intersecting with the longitudinal direction.

A first outer edge 62 of the mounting surface 61 extends from the origin point OP in the longitudinal direction (right/left direction in FIG. 2) of the apparatus main body 12, and a second outer edge 63 of the mounting surface 61 extends from the origin point OP in a direction intersecting with a scanning direction X (in the embodiment, front-side direction opposite to the rear-side direction of the apparatus main body 12). In addition, the mounting surface 61 has a third outer edge 64 at a position facing the first outer edge 62, and has a fourth outer edge 65 at a position facing the second outer edge 63.

In the configuration, the rotation of the opening/closing body 37 about the rotational axis AX causes the white document-sheet cover 38 to be displaceable between a closing position, where the white document-sheet cover covers the mounting surface 61, and an opening position, where the white document-sheet cover is separated from the mounting surface 61. In FIG. 2, in order to illustrate the white document-sheet cover 38, the opening/closing body 37 is shown wide opened such that an obtuse angle is formed between the white document-sheet cover 38 and the mounting surface 61. However, the opening/closing body 37 may be opened to the extent that it is possible to mount the document sheet G on the mounting surface 61.

The image reader 31 is provided with a first opening/closing lever 66 disposed to the rear side from the document-sheet platen 33 in the front/rear direction, and a second opening/closing lever 67 disposed at a position further separated from the rotational axis AX than the first opening/closing lever 66 in the front/rear direction such that the first opening/closing lever 66 and the second opening/closing lever 67 protrude from the frame member 35.

A guide rail 41 extends in the longitudinal direction (right/left direction in FIG. 2) of the apparatus main body 12 and projects from the bottom of the reading-unit case 32. In addition, a reading carriage 42 is accommodated inside the reading-unit case 32 along the document-sheet platen 33. The reading carriage 42 has an engagement portion 43 that engages with the guide rail 41 such that the reading carriage 42 is supported on the guide rail 41 via the engagement portion 43. A reading unit 44 is mounted on the reading carriage 42 and reads the document sheet G, which is mounted on the document-sheet platen 33, from the second surface side (lower surface side in the embodiment) opposite to the first surface of the document-sheet platen 33. The reading unit 44 is, for example, a contact-type image sensor.

The reading carriage 42 is guided by the guide rail 41 and performs a reciprocating scan along the scanning direction X that is the longitudinal direction of the apparatus main body 12. Since it is preferable that the engagement portion 43 of the reading carriage 42 with respect to the guide rail 41 be disposed in the vicinity of the center of gravity of the reading carriage 42, the engagement portion 43 is disposed in the vicinity of the center of the reading carriage 42 in the longitudinal direction Y. In addition, in the following description, in some cases, the longitudinal direction Y of the reading carriage 42 is simply described as the longitudinal direction Y. That is, the reading carriage 42 has an engagement portion 43 with respect to the guide rail 41 at a position separated from the opposite ends thereof in the longitudinal direction Y. In the embodiment, the longitudinal direction Y of the reading carriage 42 indicates a direction intersecting with the scanning direction X.

Multiple detection units 71 are arranged on the bottom of the reading-unit case 32 to detect a document sheet, which is mounted on the mounting surface 61, from the second surface side of the document-sheet platen 33. The detection unit 71 is a reflective optical sensor that has a light projecting unit that emits light to the mounting surface 61 from the second surface side of the document-sheet platen 33, and a light receiving unit for receiving light reflected from the document sheet G mounted on the mounting surface 61.

Multiple (two in the embodiment) detection units 71X (71X1 and 71X2), which are aligned in the scanning direction X, detect a length of the document sheet G in the scanning direction X. In addition, multiple (five in the embodiment) detection units 71Y (71Y1, 71Y2, 71Y3, 71Y4, and 71Y5), which are aligned in the longitudinal direction Y, detect a length of the document sheet G in the longitudinal direction Y.

In the embodiment, of the multiple detection units 71Y aligned in the longitudinal direction Y, the detection unit 71Y1 at the closest position to the origin point OP may be set to a first detection unit 71, and the detection units 71Y2, 71Y3, 71Y4, and 71Y5 arranged at positions further separated from the origin point OP than the detection unit 71Y1 may be set to second detection units. The first detection unit 71 is to detect the document sheet G with a first size (for example, size A5), and the second detection units are to detect the document sheet G with a size (for example, sizes such as B5, A4, B4, or A3) greater than the first size.

Figure 3:
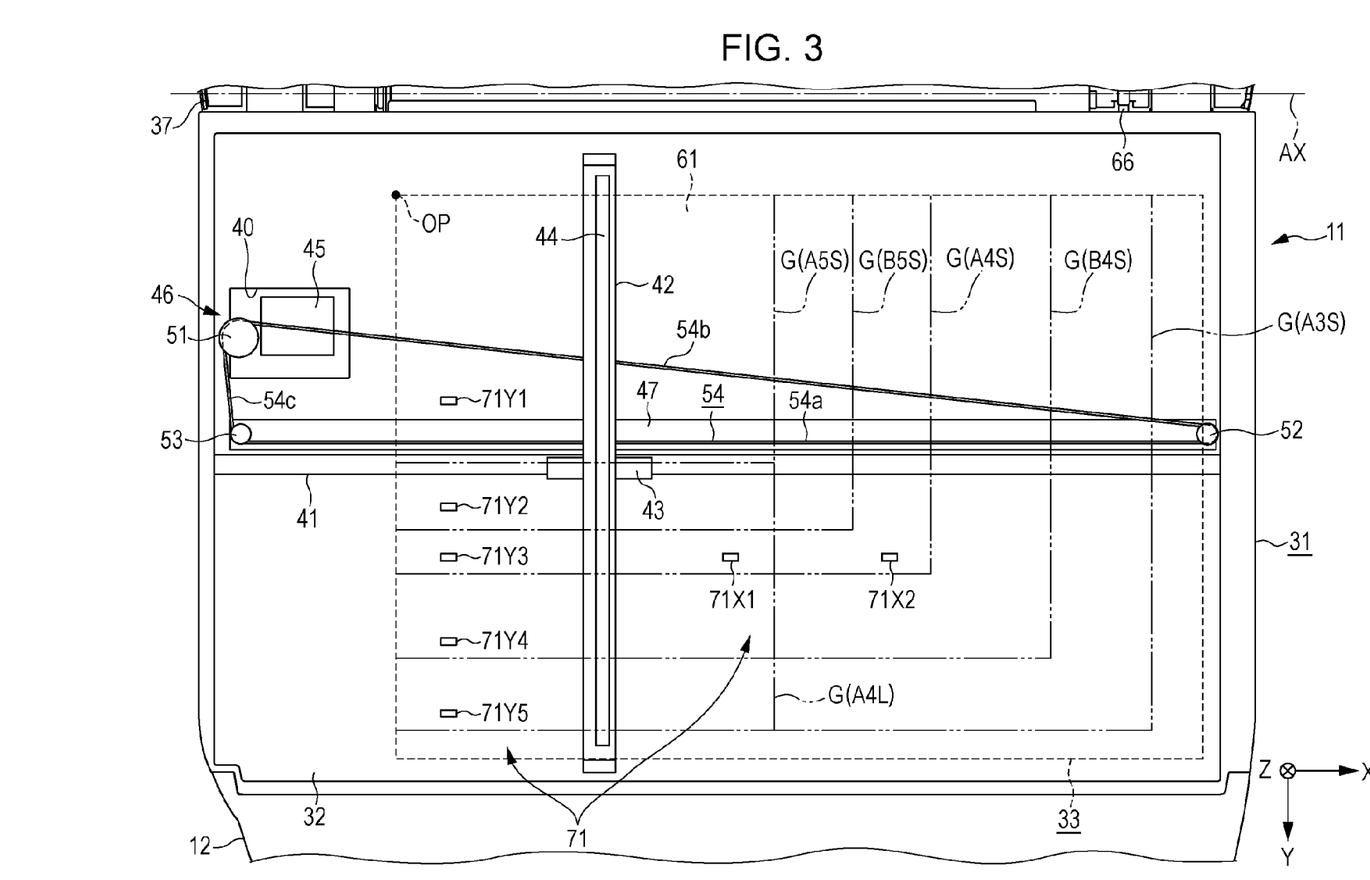
FIG. 3 is a plan view of the image reader.

As shown in FIG. 3, a drive source 45 and a transmission mechanism 46 are accommodated in the reading-unit case 32. The drive source 45 causes the reading carriage 42 to perform scanning, and the transmission mechanism 46 transmits a drive force from the drive source 45 to the reading carriage 42. In addition, in order to show an inner configuration of the reading-unit case 32, the reading platen 34 and the frame member 35 are not shown in FIG. 3, and the document-sheet platen 33 is shown with a dotted line.

The drive source 45 is, for example, a motor that can be rotated and driven in a first direction and in a second direction that is the reverse direction to the first direction. When the motor is rotation-driven in the first direction, the reading carriage 42 performs a reciprocating scan in the scanning direction X (right direction in FIG. 3). When the motor is rotation-driven in the second direction, the reading carriage 42 performs a reciprocating scan in the reverse direction (left direction in FIG. 3) to the scanning direction X.

Figure 4:
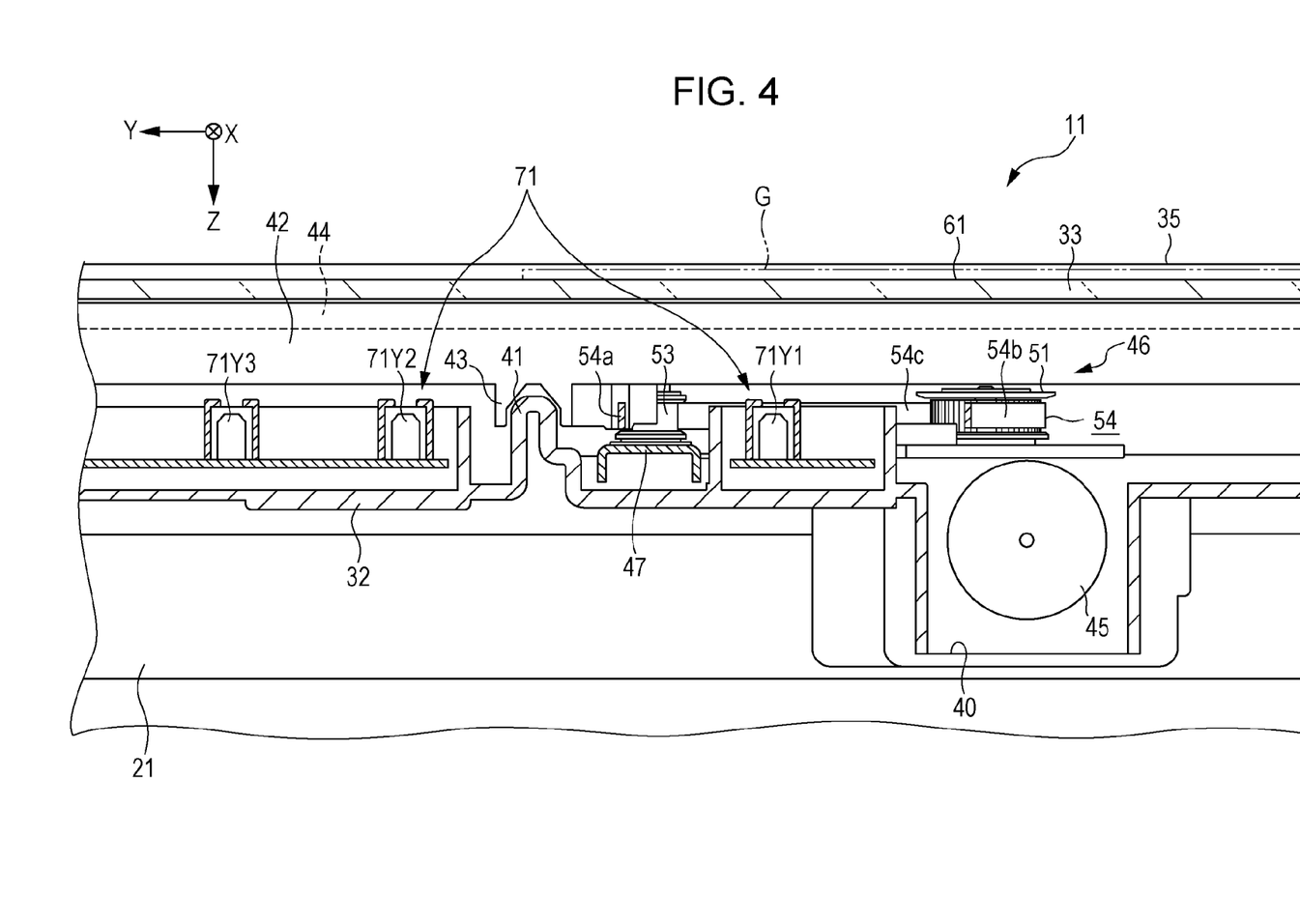
FIG. 4 is a cross-sectional view taken along line IV-IV when viewed from the arrow direction in FIG. 2.

As shown in FIG. 4, a drive source accommodating portion 40 projects downward from the bottom of the reading-unit case 32 to protrude to the recording apparatus 21. A concave portion is formed in the drive source accommodating portion 40 to accommodate the drive source 45 on the top side of the concave portion. The drive source 45 is accommodated in the drive source accommodating portion 40 and is disposed on the lower side of the reading carriage 42 such that there is no interference between the drive source 45 and the reading carriage 42.

As shown in FIG. 3, a sheet-metal member 47 as a stiffening member that extends in the scanning direction X is fixed to a position (rear side from the guide rail 41 in the embodiment), where the sheet-metal member 47 is aligned with the guide rail 41 in the longitudinal direction Y, on the bottom of the reading-unit case 32. The drive source 45 and the drive source accommodating portion 40 are disposed on the rear side from the guide rail 41 and the sheet-metal member 47 along the longitudinal direction Y in the front/rear direction, that is, on the first end side (left end side in FIG. 3) of the apparatus main body 12 in the scanning direction X.

The transmission mechanism 46 includes first and second pulleys 52 and 53 that are aligned along the guide rail 41 in the scanning direction X, a third pulley 51, and an annular belt 54 that draws the reading carriage 42. The third pulley 51 is disposed at a position different from the first and second pulleys 52 and 53 in the longitudinal direction Y intersecting with the scanning direction X, specifically at a position (position on the origin point OP side) on the first outer edge 62 side from the guide rail 41 and the pulleys 52 and 53 in the longitudinal direction Y.

The third pulley 51 is a drive pulley that rotates with the drive force from the drive source 45. The first and second pulleys 52 and 53 are driven pulleys that are rotatably disposed at the opposite ends of the sheet-metal member 47. The third pulley 51 is disposed at a position closer to the second pulley 53 than to the first pulley 52 in the scanning direction X. In addition, since it is preferable that a route be short in the transmission of the drive force from the drive source 45 to the drive pulley, the drive source 45 is disposed at a position closer to the third pulley 51 than to the first and second pulleys 52 and 53.

The belt 54 is looped over the pulleys 51, 52 and 53, and stretched into a triangle with a first side 54a formed between the first pulley 52 and the second pulley 53, a second side 54b formed between the third pulley 51 and the first pulley 52, and a third side 54c formed between the third pulley 51 and the second pulley 53.

The second side 54b of the belt 54 is disposed to have a gap between the first side 54a and the second side 54b in the longitudinal direction Y. The first detection unit 71 is disposed in a region between the first side 54a and the second side 54b of the belt 54 in the longitudinal direction Y intersecting with the scanning direction X. In addition, the second detection units 71Y2, 71Y3, 71Y4, and 71Y5 are disposed at positions further separated from the origin point OP than the belt 54 in the longitudinal direction Y.

The reading carriage 42 is fixed on the first side 54a of the belt 54 stretched in the scanning direction X to be parallel with the guide rail 41 between the two pulleys 52 and 53. The drive force of the drive source 45 causes the third pulley 51 to rotate and to make a circular movement of the belt 54. After the belt 54 is in the circular movement, the pulleys 52 and 53 rotate along with the belt and, simultaneously, the reading carriage 42 fixed to the belt 54 performs scanning along the scanning direction X.

Therefore, the reading carriage 42 has a scanning region between the first pulley 52 and the second pulley 53 in the scanning direction X. Then, the detection units 71 are arranged at positions which are overlapped with the scanning region of the reading carriage 42 in plan view.

In addition, since the reading carriage 42 has the engagement portion 43 at a position separated from the opposite ends thereof in the longitudinal direction Y, it is preferable that the reading carriage 42 be fixed to the belt 54 at a position closer to the engagement portion 43 than to the opposite ends thereof in the longitudinal direction Y. Accordingly, the reading carriage 42 is fixed to the belt 54 near the guide rail 41, thereby, suppressing horizontal tilting of the reading carriage 42 drawn by the belt 54.

It is preferable that the outer circumferential surface of the third pulley 51, over which the belt 54 is looped, be placed at a position further separated from the outer circumferential surface of the first pulley 52 than the outer circumferential surface of the second pulley 53 disposed near the third pulley 51. Accordingly, the belt 54 is stretched to form a triangle in which an obtuse angle is formed between the first side 54a and the third side 54c and an acute angle is formed between the second side 54b and the third side 54c. As a result, compared to a case where the third pulley 51 is disposed between the two pulleys 52 and 53 in the scanning direction X, the belt 54 has a longer length to be looped over the third pulley 51 (that is, the belt 54 has a large looping angle), which suppresses slipping of the belt 54 from the third pulley 51 that is the drive pulley.

However, it is not preferable that the distance between the third pulley 51 and the second pulley 53 in the scanning direction X become long, because the belt 54 has a short looping length with respect to the second pulley 53, or the apparatus main body 12 is increased in size. Therefore, the third pulley 51 is aligned with the second pulley 53 in the longitudinal direction Y, the diameter of the outer circumference of the third pulley 51 over which the belt 54 is looped is greater than that of the second pulley 53, and a portion of the outer circumference, over which the belt 54 is looped, is disposed slightly outward from that of the first pulley 52 in the scanning direction X. As a result of such a disposition of the three pulleys 51, 52, and 53, the third side 54c is the shortest side out of the three sides that the belt 54 forms.

In addition, the third pulley 51, over which the belt 54 is looped, has the outer circumference with a greater diameter than the pulleys 52 and 53, and thus the belt 54 has a longer length to be looped over the third pulley 51, which contributes to suppressing the slipping of the belt 54 from the third pulley 51. Further, the belt 54 may be a toothed belt with a tooth portion on the inner diameter side, and another tooth portion may be provided on the outer circumferential surface of the pulleys 51, 52, and 53, such that the slipping of the belt 54 from the pulleys 51, 52, and 53 is suppressed.

Subsequently, the operation of the image reader 31 configured as above will be described.

In a case of reading the document sheet G, first, the opening/closing body 37 is disposed at the opening position, and while a surface of the document sheet G to be read faces the mounting surface 61, and a corner of the document sheet G is positioned on the origin point OP, the document sheet G is mount on the document-sheet platen 33.

When the mounting of the document sheet G is completed, the opening/closing body 37 at the opening position is caused to rotate to the closing position. Then, rotation of the opening/closing body 37 to a position where the first opening/closing lever 66 is pressed causes the detection unit 71 to perform detection of the document sheet G mounted on the mounting surface 61.

When the detection unit 71 is the reflective optical sensor, the detection operation for the document sheet G is performed as follows. Light is emitted from the light projecting unit and, on the basis of an amount of light received by the light receiving unit, the detection result is output. For example, in a case where the amount of light received by the light receiving unit is equal to or greater than a threshold value when the light projecting unit emits light to the mounting surface 61, it is determined that the emitted light is reflected from the document sheet G on the mounting surface 61, and a detection result of "1" is output to indicate that there is present a document sheet G. In contrast, in a case where the amount of light received by the light receiving unit is less than the threshold value, a detection result of "0" is output to indicate that there is no document sheet G.

Figure 5:
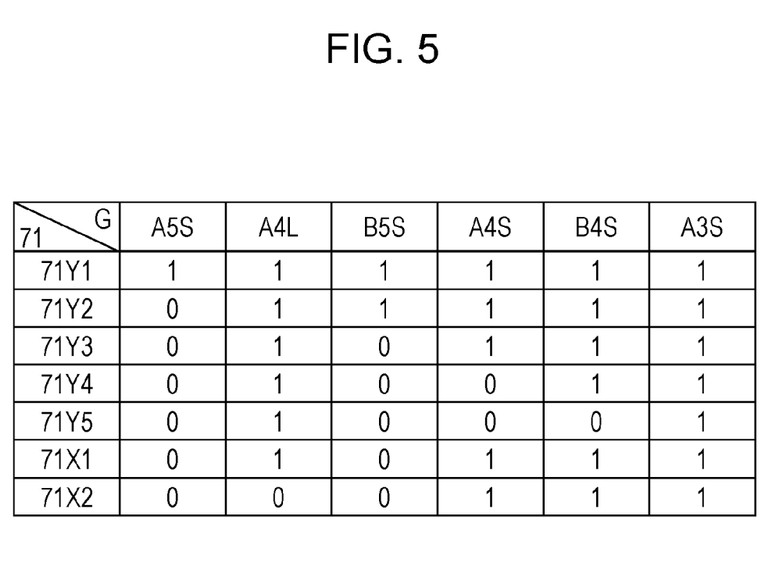
FIG. 5 is a table illustrating a relationship between an output result of a detection unit and a detected document sheet.

As shown in FIG. 5, the size and orientation of a document sheet G mounted on the mounting surface 61 are detected on the basis of a combination of detection results ("1" or "0") of the detection units 71Y1, 71Y2, 71Y3, 71Y4, 71Y5, 71X1, and 71X2. In addition, in a case where "0" is output from all of the detection units 71, the detection result is output to indicate that there is no document sheet G.

In addition, when the scanning direction X indicates a landscape direction, the longitudinal direction Y indicates a portrait direction, then, when the document sheet G is mounted such that the scanning direction X becomes the longitudinal direction of the document sheet G, it is referred to as landscape mounting, and when the document sheet G is mounted such that the longitudinal direction Y becomes the longitudinal direction of the document sheet G, it is referred to as portrait mounting. Then, in FIGS. 3 and 5, a document sheet G (A5S) indicates the landscape mounting of A5 size, a document sheet G (A4L) indicates the portrait mounting of A4 size, a document sheet G (B5S) indicates the landscape mounting of B5 size, a document sheet G (A4S) indicates the landscape mounting of A4 size, a document sheet G (B4S) indicates the landscape mounting of B4 size, and a document sheet G (A3S) indicates the landscape mounting of A3 size.

That is, the detection units 71X1, 71X2, 71Y1, 71Y2, 71Y3, 71Y4, and 71Y5 are arranged at positions overlapped with the corresponding document sheet G in plan view, such that it is possible to distinguish between the document sheets G with multiple sizes, and orientations of the document sheets G.

Subsequently, when the opening/closing body 37 further rotates to press the second opening/closing lever 67, it is detected that the white document-sheet cover 38 is disposed at the closing position. Then, the disposition of the opening/closing body 37 at the closing position causes the reading carriage 42 to perform scanning, and the reading unit 44 mounted on the reading carriage 42 to perform the reading of the document sheet G based on the detected size and orientation of the document sheet G.

Incidentally, since it is necessary to arrange the detection units 71Y1, 71Y2, 71Y3, 71Y4, and 71Y5 at the positions where it is possible to distinguish between the document sheets G with multiple sizes and the orientations of the document sheets G, it is difficult to change the positions at least in the longitudinal direction Y.

Since it is preferable that the engagement portion 43 of the reading carriage 42 be disposed in the vicinity of the center of gravity of the reading carriage 42, the guide rail 41 and the engagement portion 43 are arranged in the vicinity of the center of the reading carriage 42 in the longitudinal direction Y.

Further, since it is preferable that the reading carriage 42 be fixed to the belt 54 at a position close to the engagement portion 43, the belt 54 is disposed on the rear side or on the front side of the guide rail 41 in the longitudinal direction Y. However, in any case, it is necessary for the belt 54 to be disposed where no interference with the detection unit 71 occurs.

Here, as shown in FIG. 4, the detection units 71, the belt 54, and the guide rail 41 are all arranged below the reading carriage 42 in the perpendicular direction. In order to suppress a height (length in the perpendicular direction Z) of the multifunction printer 11, it is preferable that the detection units 71, the belt 54 and the guide rail 41 be arranged to overlap one another in the perpendicular direction Z, and be aligned in the horizontal direction.

In the embodiment, since the number of the detection units 71 to be disposed on the rear side (origin point OP side) from the guide rail 41 is one, and the number of detection units 71 to be disposed on the front side of the guide rail 41 is four, the belt 54 is disposed on the rear side from the guide rail 41 where the number of the arranged detection units 71 is low. The first detection unit 71 is disposed in a region between the first side 54a and the second side 54b of the belt 54, such that, on the rear side from the guide rail 41, the belt 54 does not interfere with the first detection unit 71.

In addition, in the embodiment, since the belt 54 is looped over the three pulleys 51, 52, and 53, a wider region is formed between the first side 54a and the second side 54b than in a case where the belt 54 is looped over the two pulleys 52 and 53. Therefore, the first detection unit 71 is flexibly disposed in the region between the first side 54a and the second side 54b of the belt 54, on the rear side from the guide rail 41.

As a result of disposition of the belt 54 on the rear side from the guide rail 41 in the front/rear direction as the longitudinal direction Y, the three pulleys 51, 52, and 53 and the drive source 45 are also disposed on the rear side from the guide rail 41.

Similarly, since the drive source 45 is accommodated in the drive source accommodating portion 40 formed on the bottom of the reading-unit case 32, it is difficult for the drive source to be disposed at a position to be overlapped with the guide rail 41 formed on the bottom of the reading-unit case 32. Then, since it is preferable that the drive source 45 be disposed at a position closer to the drive pulley, the two pulleys 52 and 53 aligned along the guide rail 41 may be the driven pulleys, and the third pulley 51 at a position separated from the guide rail 41 may be the drive pulley.

According to the above-described embodiments, it is possible to achieve the following effects.

(1) Since the first detection unit 71 is disposed in the region between the first side 54a and the second side 54b of the belt 54, it is possible to suppress the interference between the belt 54 that draws the reading carriage 42 and the first detection unit 71 that detects the document sheet G.

(2) Since the reading carriage 42 is fixed to the first side 54a of the belt 54 which extends in the scanning direction X, it is possible to suppress the inclination of the reading carriage 42 which is drawn by the belt 54, during scanning.

(3) Since the belt 54 is looped over the three pulleys 51, 52, and 53, it is possible to achieve a wider region between the first side 54a and the second side 54b, than in a case of being looped over the two pulleys 52 and 53. Accordingly, it is possible to flexibly dispose the first detection unit 71 in the region between the first side 54a and the second side 54b.

(4) The drive source 45 is disposed at a position closer to the third pulley 51 than to the first pulley 52 and to the second pulley 53, and thus it is possible to shorten the route to transmit the drive force from the drive source 45 to the drive pulley.

(5) The third pulley 51 is disposed closer to the origin point OP than the first pulley 52 and the second pulley 53 in a direction (longitudinal direction Y) intersecting with the scanning direction X, and thus, it is possible for the region formed between the first side 54a and the second side 54b of the belt 54 to become wider toward the origin point OP side in the scanning direction X. Accordingly, it is possible to dispose the detection unit 71, which is disposed in the region between the first side 54a and the second side 54b, at the position closer to the origin point OP.

(6) in addition to the first detection unit 71 disposed between the first side 54a and the second side 54b of the belt 54 in the longitudinal direction Y intersecting with the scanning direction X, the second detection units 71Y2, 71Y3, 71Y4, and 71Y5 are arranged at positions further separated from the origin point OP than the belt 54, and thus, it is possible to detect the document sheets G with multiple sizes.

(7) Since the reading carriage 42 has the engagement portion 43 with respect to the guide rail 41 at a position separated from the opposite ends thereof in the longitudinal direction Y, the guide rail 41 is disposed in the vicinity of the center of the gravity on the reading carriage 42, and thus it is possible to suppress the inclination of the reading carriage 42 in the perpendicular direction Z. In addition, since the reading carriage 42 is fixed to the belt 54 at the position close to the engagement portion 43 that engages with the guide rail 41, it is possible to suppress the inclination of the reading carriage 42 in the scanning direction X, which is drawn by the belt 54.

In addition, the above-described embodiments may be modified as follows.

The belt 54 may be looped over two pulleys. For example, without the pulley 51, the belt 54 may be looped over the two pulleys 52 and 53. In this case, when a configuration is employed, in which the drive force from the drive source 45 is transmitted to the second pulley 53 through the transmission mechanism, such as a gear train, it may be possible for the drive source accommodating portion 40 to be disposed at a position separated from the guide rail 41. Further, when the second pulley 53 has a greater diameter than the first pulley 52, a gap (region) with an approximate triangle shape is formed between the first side 54a and the second side 54b in plan view. Therefore, it is possible to further flexibly dispose the first detection unit 71.

The belt 54 may be looped over four or more pulleys. For example, a fourth pulley may be disposed at a position closer to the first outer edge 62 in the longitudinal direction Y than the first pulley 52, that is, at a position closer to the fourth outer edge 65 in the scanning direction X than the third pulley 51, and thus, the belt 54 may be looped over those first to fourth pulleys. In this configuration, the belt 54 is stretched to form a rectangle in plan view, so that the first side 54a is formed between the first pulley 52 and the second pulley 53, and the second side 54b is formed between the third pulley 51 and the fourth pulley. Accordingly, a wider region is formed between the first side 54a and the second side 54b, and it is possible to flexibly dispose the first detection unit 71.

The reading carriage 42 may be supported on the multiple guide rails 41 that are aligned in the longitudinal direction Y. In this configuration, it is possible to suppress the inclination of the reading carriage 42 in the horizontal direction and the perpendicular direction Z. When this configuration is employed, the belt 54 and the detection unit 71 may be arranged between the two guide rails 41 that are aligned in the longitudinal direction Y, or the belt 54 and the detection unit 71 may be arranged on the rear side or on the front side from the guide rail 41 positioned on an end in the longitudinal direction Y.

In the mounting surface 61, the outer edges 63 and 65 that extend in the longitudinal direction Y may be longer than the outer edges 62 and 64 that extend in the scanning direction X, or the lengths of the outer edges 62 and 64 and the outer edges 63 and 65 may be equal to one another. In addition, the mounting surface 61 may not have a rectangular shape.

The number or dispositions of the detection units 71 can be arbitrarily changed depending on the size or orientation of the document sheet G to be detected. For example, only one detection unit 71 may be provided such that only the presence/absence of the document sheet G is detected, or multiple detection units 71 may be arranged in the region formed by the annular belt 54.

The recording apparatus 21 to be provided in the multifunction printer 11 is not limited to a printer, but, for example, may be a facsimile or a copying apparatus. In addition, the image reader 31 is not limited to a scanner, but, for example, may be a card reader or an authentification device.

Further, technical ideas that are understood from the above-described embodiments and modified examples are described below.

(A) An image reader includes: a document-sheet platen having a mounting surface of a document sheet on a first surface thereof; a detection unit that detects a document sheet mounted on the mounting surface from a second surface side opposite to the first surface of the document-sheet platen; a reading unit that reads a document sheet mounted on the mounting surface from the second surface side of the document-sheet platen; and the reading carriage on which the reading unit is mounted and which performs scanning along the document-sheet platen in the scanning direction; and an annular belt that draws the reading carriage, in which the detection unit is disposed in a region formed inside the annular belt.

In this configuration, the detection unit is disposed in the region that is formed by the annular belt. Therefore, it is possible to suppress the interference between the belt that draws the reading carriage and the detection unit disposed at the position to be overlapped with the scanning region of the reading carriage.

The entire disclosure of Japanese Patent Application No.: 2013-214418, filed Oct. 15, 2013 is expressly incorporated by reference herein.

What is claimed is:

1. An image reader comprising:
a document-sheet platen that has a mounting surface of a document sheet on a first surface;
a detection unit that detects a document sheet mounted on the mounting surface from a second surface side opposite to the first surface of the document-sheet platen;
a reading unit that reads a document sheet mounted on the mounting surface from the second surface side of the document-sheet platen;
a reading carriage on which the reading unit is mounted and which moves along the document-sheet platen;
a first pulley and a second pulley that are aligned in a moving direction of the reading carriage; and
an annular belt that draws the reading carriage in the moving direction, is disposed on the second surface side opposite the first surface of the document-sheet platen, and is looped over the first pulley and the second pulley, wherein
the detection unit is arranged to overlap a region formed inside the annular belt.

2. The image reader according to claim 1, further comprising:
a third pulley that is disposed at a position different from the first pulley and the second pulley in a direction intersecting with the moving direction,
wherein the belt is looped over the first pulley, the second pulley, and the third pulley.

3. The image reader according to claim 2, further comprising:
a drive source for moving the reading carriage to,
wherein the third pulley is a drive pulley that rotates with a drive force from the drive source, and
the drive source is disposed at a position closer to the third pulley than to the first pulley and to the second pulley.

4. The image reader according to claim 2,
wherein, an origin point is set on a first end of the mounting surface in a direction intersecting with the moving direction and on a first end of the mounting surface in the moving direction,
the second pulley is disposed at a position closer to the origin point than the first pulley in the moving direction, and outside of the mounting surface in the moving direction, and
the third pulley is disposed at a position closer to the origin point than the first pulley and the second pulley in a direction intersecting with the moving direction, closer to the second pulley than to the first pulley in the moving direction, and outside of the mounting surface in the moving direction.

5. The image reader according to claim 1,
wherein an origin point is set on a first end of the mounting surface in a direction intersecting with the moving direction, and on a first end of the mounting surface in the moving direction,
the image reader further comprises a second detection unit that detects a document sheet with a greater size than the first size, when the detection unit that detects a document sheet with a first size is set to a first detection unit, and
the second detection unit is disposed at a position further separated from the origin point than the belt in a direction intersecting with the moving direction.

6. The image reader according to claim 1, further comprising:
a guide rail that guides the moving of the reading carriage,
wherein, when a direction intersecting with the moving direction indicates the longitudinal direction of the reading carriage, the reading carriage has an engagement portion with respect to the guide rail at a position separated from the opposite ends thereof in the longitudinal direction, and is fixed to the belt at a position closer to the engagement portion than to the opposite ends.

7. The image reader according to claim 6,
wherein the detection unit, the belt, and the guide rail are arranged to overlap one another in a direction along the document-sheet platen.

8. The image reader according to claim 1,
wherein the detection unit and the belt are arranged to overlap one another in a direction along the document-sheet platen.

* * * * *